(12) United States Patent
Huttle

(10) Patent No.: US 8,891,355 B1
(45) Date of Patent: Nov. 18, 2014

(54) INFORMATION TRANSMITTER WITH VARIABLE PULSE WIDTH ENCODING

(71) Applicant: The United States of America, as represented by the Secretary of the Navy, Washington, DC (US)

(72) Inventor: William M. Huttle, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/873,268

(22) Filed: Apr. 30, 2013

Related U.S. Application Data

(63) Continuation of application No. 12/657,877, filed on Jan. 28, 2010, now Defensive Publication No. H,002,274.

(60) Provisional application No. 61/207,237, filed on Jan. 30, 2009.

(51) Int. Cl.
*H04J 7/00* (2006.01)
*H04L 25/49* (2006.01)

(52) U.S. Cl.
CPC .................................. *H04L 25/4902* (2013.01)
USPC ........... 370/212; 370/204; 370/205; 375/237; 375/239; 375/311

(58) Field of Classification Search
CPC ...... H04B 14/04; H04B 14/026; H04B 14/62; H04B 25/4902; H04J 3/1676; H04J 3/04
USPC ......... 370/204, 205, 212, 237, 238, 239, 311, 370/312, 109, 112; 375/238; 329/311; 341/51, 53, 55, 57, 60, 64
See application file for complete search history.

(56) References Cited

U.S. PATENT DOCUMENTS

| | | | |
|---|---|---|---|
| 4,159,448 A | 6/1979 | Parham | 325/38 |
| 4,817,115 A | 3/1989 | Campo et al. | 375/238 |
| 5,121,366 A | 6/1992 | Wayner et al. | 367/134 |
| 5,363,405 A | 11/1994 | Hormel | 375/219 |
| 5,615,228 A | 3/1997 | Soenen | 375/238 |
| 5,633,742 A | 5/1997 | Shipley | 398/118 |
| 6,094,238 A | 7/2000 | Shafer | 348/734 |
| 6,256,557 B1 | 7/2001 | Avila et al. | 701/1 |
| 6,456,221 B2 | 9/2002 | Low et al. | 341/157 |
| 6,781,530 B2 | 8/2004 | Moore | 341/107 |
| 6,862,317 B1 | 3/2005 | Mohan et al. | 375/238 |
| 6,947,493 B2 | 9/2005 | Cohen et al. | 375/295 |
| 7,116,916 B2 | 10/2006 | Cochran et al. | 398/183 |
| 2005/0063708 A1 | 3/2005 | Melick et al. | 398/141 |
| 2007/0165740 A1 | 7/2007 | Koslar et al. | 375/271 |
| 2009/0103636 A1 | 4/2009 | Stewart | 375/359 |
| 2009/0134948 A1 | 5/2009 | Miwa | 332/112 |

*Primary Examiner* — Awet Haile
(74) *Attorney, Agent, or Firm* — Gerhard W. Thielman, Esq

(57) ABSTRACT

A communication device is provided for transmitting information incorporated into at least one message packet. The device includes components for encoding the message packet as a signal, which is afterwards transmitted and analyzed. The encoder assigns the message packet to correspond to a specific pulse width. The transmitter sends the signal across a channel. The processor parses the signal as corresponding to the specific pulse width subsequently decoded to obtain the message packet.

5 Claims, 6 Drawing Sheets

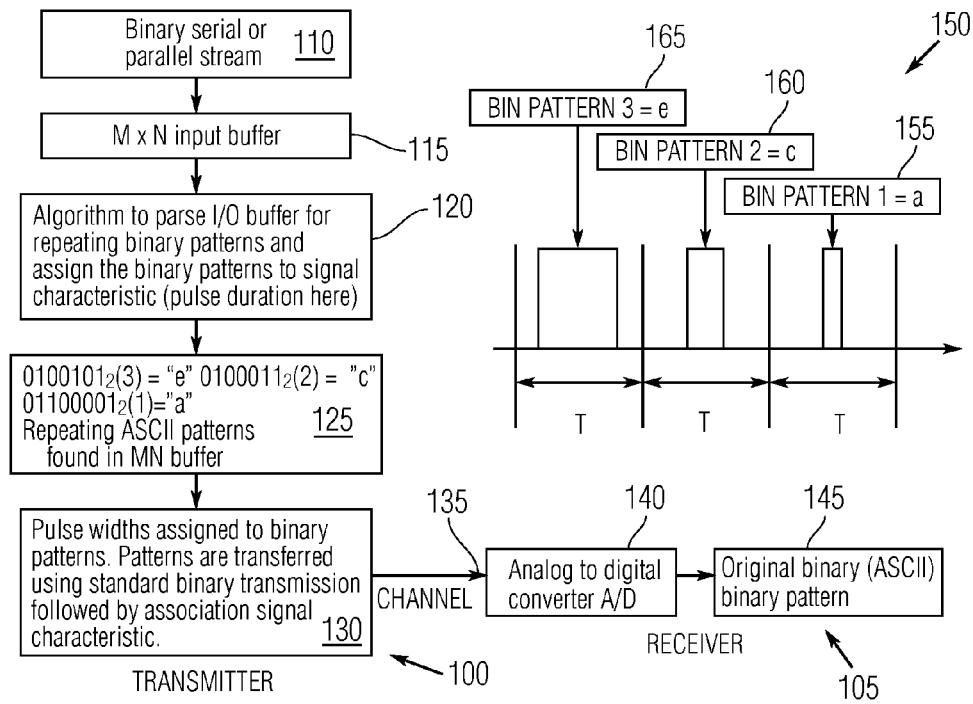
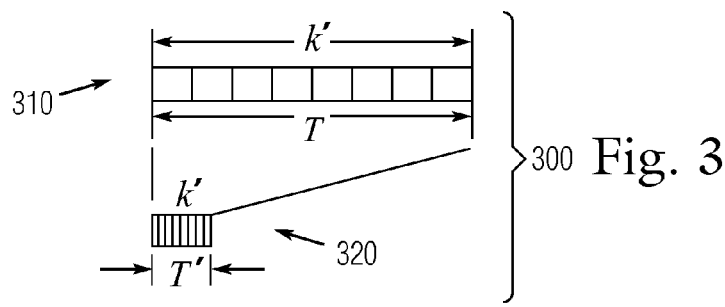
Fig. 3
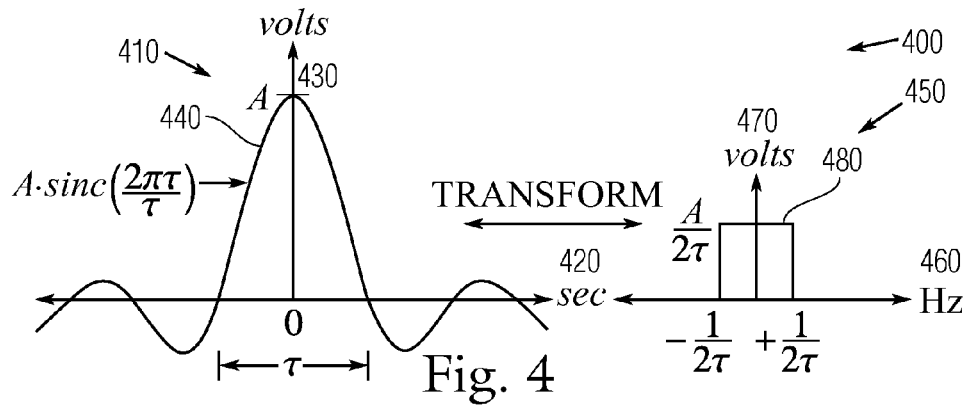
Fig. 4

INFORMATION TRANSMITTER WITH VARIABLE PULSE WIDTH ENCODING

CROSS REFERENCE TO RELATED APPLICATION

The invention is a Continuation, claims priority to and incorporates by reference in its entirety patent application Ser. No. 12/657,877 filed Jan. 28, 2010 and issued as Statutory Invention Registration H002274, which pursuant to 35 U.S.C. §119, the benefit of priority from provisional application 61/207,237, with a filing date of Jan. 30, 2009, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to data encoding for information transmission, and more particularly to encoding using variable pulse width, phase frequency and/or amplitude.

Data communications between a Host and a Client may include using a modulator-demodulator (modem), which converts digital information to analog information and vice versa. Typically, the modem performs pulse conversion of binary data from higher layers. The binary data may reside at the Physical layer of the (seven layer) Open Systems Interface (OSI) model for physical linkage between the Host and Client for transmitted and received data. These seven layers include: a) OSI Layer 1—Physical, b) OSI Layer 2—Data Link, c) 081 Layer 3—Network, d) OSI Layer 4—Transport, e) OSI Layer 5—Session, f) OSI Layer 6—Presentation, and g) OSI Layer 7—Application.

Current transmission technologies use standard communication exchange protocols, which are based on binary transmission, in which (for positive logic) a "1" is represented as positive voltage and a "0" is represented as no voltage. The transmission is based on a system clock. Binary transmission over wire and wireless media has been exploited for many years.

SUMMARY

Various exemplary embodiments provide techniques for highly secure short and long message communications. These techniques provide a secure link that is undetectable by standard protocol analyzers and is sufficiently random to satisfy contemporary encryption standards. In one case, the pulse widths of 1's and 0's may be altered to render the information contained therein to be undetectable, even within binary based formats.

Conventional data encoding techniques yield disadvantages addressed by various exemplary embodiments of the present invention. In particular, the use of variable width pulses (exemplified in this disclosure because it is the easiest to understand) facilitates secure communication. For example, changing coding and rotating keys reduces transmission detectability.

Various exemplary embodiments provide for variable pulse widths to encode a binary or other type of signal. Information can be incorporated into at least one message packet to provide operations that include encoding the message packet as a signal, transmitting and analyzing the signal to be decoded to obtain the transmitted message packet. The encoding operation assigns the message packet to correspond to a specific pulse width. The signal is transmitted across a channel to a recipient. The analyzing operation by the recipient parses the signal as corresponding to the specific pulse width, which is then decoded to obtain the message packet.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1 is a block diagram of a communications channel system;

FIG. 3 is a temporal compression diagram;

FIG. 4 is a graph of a sinc pulse and corresponding Fourier Transform;

DETAILED DESCRIPTION

Figure 2:
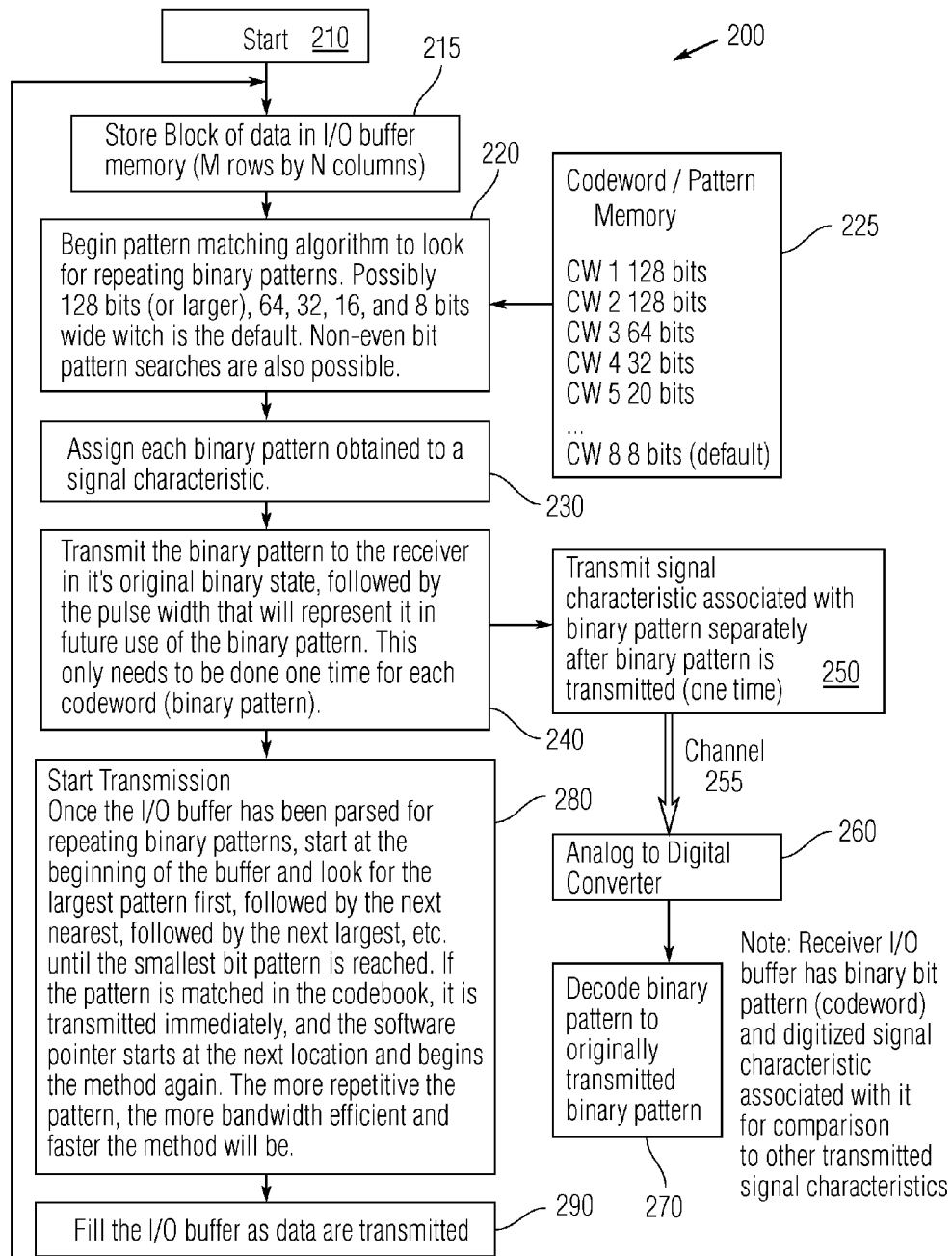
FIG. 2 is a block diagram of codeword transfer to a communications channel.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Eavesdropping only needs to intercept data along a communications line and decode them. For various exemplary embodiments, the eavesdropper also needs to observe the signal characteristic and map it to its binary equivalent rendering the deciphering task more difficult.

The techniques described herein relate to data encoding for information transmission, and more particularly to encoding information using characteristics of electrical signals, such as pulse width, amplitude (e.g., either voltage or current), phase, frequency, or combinations thereof. Thus, a single variation in pulse width, phase, frequency, or amplitude can be associated with large strings of information or separate symbols without the use of long strings of bits to characterize a symbol.

In general, the more information (as bits) that can be encoded into a signal characteristic, the greater the efficiency of the technique. Software parses blocks of information into repeating binary patterns or strings and stores the results into a "codebook" for storage in memory.

Various exemplary embodiments describe a process of information transmission based on pulse width duration to reduce signal, exchange overhead. The type of information transmission described herein is based on the electrical (or analog) characteristics, and in particular to the time duration of transmitted and received pulses. This process for amplifying pulsed data enables increase in the data rate above standard data transmission rates.

Protocol:

The procedure described for the exemplary embodiments enables peers in a multi-drop network to communicate via a synchronous/asynchronous serial variable protocol. Handshaking and control signals may have specified pulse widths recognizable only by the participants in the network. Each participant possesses a protocol "key" for access. The protocol may be used for identification, and afterwards enable standard communication. Alternatively, the protocol may be used singly, such as by constantly changing protocols according to Host and User keys.

Binary Data:

Binary data may be transmitted as "clear text" such as in American Standard Code for Information Interchange (ASCII) for initialization. However, the binary data transmitted need not be in ASCII. Any binary data transmitted and received should be understood by the transmitter and receiver. The binary data can be encoded and decoded to a secondary layer for mapping to ASCII. The techniques described herein may be performed by a single-ended or differential circuit. As those of ordinary skill in the art will recognize, other media may be used to implement these techniques, including serial full and half duplex, parallel communication circuits, radio frequency (RF), wireless and optical media. Groups or strings of information may be collected together with variable pulse widths. These collections may also be segmented and reassembled at the receiver according to a "code key" or other identifier.

Binary Information:

Typically, binary information may be transmitted as 1's and 0's. A binary "1" would be a high level voltage for a period of several master clock cycles, and a binary "0" would be, for example, a negative or no voltage for several cycles. This is known as bit timing.

For the purposes of this disclosure, the timing restriction for identifying (i.e., determining what constitutes) a "1" or "0" may be relaxed, to enable variable time duration of the electrical pulses. The duration of each pulse may constitute a larger amount of information. Transfer of information can be reduced to the time required to transmit a single pulse.

Information Coding:

Algorithms at higher layers may be used to encode and decode information. The transmission may generally be described for baseband (or modulated) signaling at the physical layer (including wireless transmission) of the international standards organization (ISO) model, but alternatively may be implemented at higher layers also (as a separate "stack").

The techniques herein describe a hybrid of baseband and bandpass transmission. Various exemplary embodiments can also be considered as both an information compression and channel coding method. By varying a characteristic of a signal (such as its duration/bandwidth, amplitude, frequency, or phase), binary data can be encoded to include groups of bits into a single characteristic of a varying signal characteristic. For example, a long string of binary data can be encoded into pulse duration, bandwidth, amplitude, frequency, phase, or any combination of thereof. The process applies to any type of data transmission, which includes wired and wireless communications. These are typically grouped into "baseband" and "passband" communication systems.

Baseband signals employ the entire bandwidth of the communications channel for a single signal. Typical baseband signals have names such as RZ (Return-to-Zero), AMI (Alternate Mark Inversion), NRZ (Non-Return-to-zero), Phase Encoded and Multi-Level Binary. Baseband refers to the band of frequencies delivered by a source. Baseband channels are suitable for transmission over a pair of wires or coaxial cable, such as Ethernet.

Passband systems are characterized by manipulation of the information in the "frequency" domain. Passband transmissions combine multiple signals using different frequencies on the same communications channel simultaneously (uplink and downlink). Baseband information can be shifted to any frequency desired by use of an appropriate carrier. The baseband signal occupies a specific bandwidth centered on the "modulation" frequency. Other passband methods vary the characteristics of the carrier signal itself, as in modulation by amplitude (AM), phase (PM), or frequency (FM), in which the binary data are mixed (i.e., combined) with the baseband data.

The Roman alphabet contains only twenty-six letters, comparable to other non-pictographic symbols. Written communication typically employs distinctions between capital and small (or alternatively ending and non-ending forms, as well as punctuation and numerals. The extended ASCII table contains only 127 distinct characters. Sentence strings also can be transmitted, and a type of grammatical "glue" may be used to translate the strings, such as used in standard spelling and grammatical checkers, i.e., when recombining data.

In extended ASCII transmission, the character "a" has a decimal equivalent of 97, and a binary equivalent of 01100001, which is 8 bits. In other words, the character "a" takes 8 bits to transmit. A single pulse (pulse duration is used throughout this disclosure because this represents the simplest manifestation of the concept) can be assigned to (i.e., represent) the character "a". This is illustrated in FIG. 1 as block diagrams for a transmitter 100 and a receiver 105.

Within the transmitter 100, a serial or parallel stream 110 from "higher layers" (i.e., as described in the OSI model) is placed in I/O memory, commonly referred to as an I/O buffer 115. In simplest terms, the buffer can be described as an M row by N column matrix repository. An analytical parsing operation 120 enables the buffer 115 to be parsed for repeating binary patterns. The parsing identifies each ASCII bit stream by its corresponding letter and position at 125. The process assigns each binary pattern at 130 to be associated with a signal characteristic, such as pulse width. The pulse may then be transmitted over the channel 135 (wire or wireless) to the receiver 105. The received signal can be converted to digital by an analog-to-digital converter (ADC) 140, and converted to its original binary pattern at 145.

FIG. 1 further illustrates an example pulse width diagram 150 for transmission of three binary patterns. These patterns are the equivalent of transmission of the ASCII string "ace" that constitutes concatenation of the "a", "c" and "e" letters in corresponding first, second and third bins. In standard transmission, the interval can be defined as the T=1 bit-period. The pattern 01100001 for "a" can be associated with (i.e., converted to) a 2 ns (nano-second) pulse 155. The pattern 01100011 for "c" is associated with a 4 ns pulse 160, and the pattern 01100101 for "e" is associated with a 6 ns pulse 165. These pulses are sent through the channel 135.

Codebook Reduction

In general, there are two different ways of looking at initialization of codebooks: Static and Dynamic. Static Initiation provides the simplest method of codebook (pattern storage), and includes the base vocabulary (i.e., ASCII and extended ASCII) which contains all the symbols of the language, and frequently occurring phrases and other constructs used in that language, which are incorporated into the codebook or base vocabulary of the host transmitter and receiver. A Universal Synchronous/Asynchronous Receiver/Transmitter (USART) represents the simplest example of a static codebook, in this case, converting serial data to binary strings that are then converted to ASCII characters.

Dynamic Initiation provides a more enhanced method in which the I/O buffer is parsed to determine repeating binary patterns in the data. The buffer may be parsed for any length binary pattern, but larger (repeating) patterns can be preferable. There are numerous pattern searching algorithms, such as the Boyer-Moore string search algorithm, and more recently the Franek, Jennings, and Smyth (FJS) algorithm. The static codebook may be included as part of this method:

The search process is further illustrated in FIG. 2 as a flowchart diagram 200 for transmission and reception. Initially after start at 210, the process stores binary data to be transferred in an I/O memory buffer at 215. The process parses the data at analyzer 220 using a pattern matching algorithm for repeating binary patterns. The patterns searched for can be of varying length, but larger repeating patterns are more advantageous, because a larger quantity of data can be encoded into a single electrical characteristic. The search at analyzer 220 may start with 126 bits (or larger bit patterns), followed by 64 bits, 32 bits, 16 bits, and finally 8 bits representing the ASCII default width. In addition, a "static" codebook can already be available for codewords that contain the extended ASCII binary codes and frequently occurring patterns and phrases in the alphabet (language) transmitted at 225.

As each binary pattern is determined, the process transmits the signal at 250 in binary from the transmitter 100 to the receiver 105. Initially, the transmitter 100 may send or otherwise provide the codebook strings in clear-text to the receiver 105. The transmitter 100 can store the binary pattern associated with the signal characteristic at an address in memory. The associated electrical characteristic is converted to binary and saved as a codeword in the receiver's codebook as a binary pattern. The receiver 105 can also retransmit the signal characteristic back to the transmitter 100 and remap the transmitted information. This provides equalization between the transmitter 100 and receiver 105.

The receiver 105 compares the ASCII stored clear-text message to the received binary transmission to verify accuracy. Directly after transmission of the binary pattern 240, a signal characteristic is also transmitted to the receiver 105. Thus, each binary pattern may be assigned a separate signal characteristic (e.g., a different pulse width). Multiple bit patterns can be transmitted in this manner. The transmitter 100 preferably transmits each codeword in binary consecutively so that the receiver 105 has a record of the transmitted binary data for comparison.

At the receiver 105, the transmitted binary pattern may be stored in an I/O memory buffer (on the receiver) and the pulse (or alternative signal characteristic) is digitized using an ADC 260, thereby performing equalization on the analog input signal. The digitized pattern may be associated with the binary pattern transmitted. In general, these digital patterns may not be the same, but a one-to-one correspondence between the two signals should preferably to be maintained for proper decoding. In the other direction the heuristic is the same for half and full duplex.

The next step starts at the beginning of the original I/O buffer and begin transmission 280. Transmission may preferably be started by comparing the binary information to be transmitted to stored codewords starting with the largest binary patterns, which for this example are 128-bit patterns. All 128-bit patterns which were assigned codewords are searched in the codebook table. If a match is found, the corresponding pulse can be transmitted. If no such 128-bit match occurs, the next smallest binary bit pattern may be searched for at the beginning of the I/O buffer 215.

This process continues until only 8-bit patterns remain, which is the default ASCII width. Upon transmission of the pulse, the operation concludes at the last matching binary pattern and the process repeats. As codewords leave the I/O buffer, new binary data (min 128 bits) can be entered into the I/O buffer for comparison to existing codewords. If no match is found for greater than 8 bits, more data may be entered.

The process has a reduction relationship to the Shannon's Capacity Theorem. Large groups of bits can be encoded into a signal characteristic such as pulse duration, phase, amplitude, or frequency. The binary message transmitted can be treated as binary "blocks" of information.

The Capacity Theorem can be stated in terms of channel capacity C in relation to binary source rate R as:

$$R \leq k/T < W \log_2(1+P_S/WN_0) = C, \text{ or} \quad (1)$$

$$R \leq 3.322 \, W \log_{10}(1+P_S/WN_0), \text{ in base 10}, \quad (2)$$

where $R$ = Binary source rate delivered to the channel, bits/second

= $\log_2(M) \div T$ bits/second, where one of $M$ equally likely messages (blocks of bits) is transmitted in $T$ seconds. such that $M = 2^{RT} = 2^k$, equivalent to $\log_2$ $M = RT = k$ = $k \div T$ (in bits per second);

$k$ = the number of bits in each equal-length $M$-bit block $T$ = duration over which the $k$ bits are transmitted $P_S$ = Average power of the signal (in Watts);

$W$ = Bandwidth of the signal (in Hertz); and $N_0$ = Single-sided Power Spectral Density of white Gaussian Noise (in Watts per Hertz)

= $4 \times 10^{-21}$ W/Hz.

Gaussian Channel Capacity has two interpretations. The negative statement states for source rate exceeding capacity, R>C, and the number of equally likely messages being large, $M=2^{RT}=2^k$, that the probability of error approaches unity (i.e., 100% error) for every possible set of M transmitter signals. For source rate less than capacity, R<C, and M being sufficiently large, there exist sets of M transmitter signals such that the probability of error achievable with optimum receivers can be arbitrarily small. Thus, the source rate R should preferably remain less than the channel capacity C.

To examine the channel capacity's relation to various embodiments, multiple patterns of bits can be converted to a single equivalent "pulse width" or other signal characteristic, such as a phase difference. This enables an increase in channel capacity by either reducing the time interval from T to T' and/or increasing the number of bits from k to k', such that:

$$R=k'/T'>k/T \quad (3)$$

where prime denotes equivalent values. Hence, the source rate R can be increased without expanding the bandwidth required by the channel. Because R≤C, channel capacity has been increased using the same bandwidth.

FIG. 3 illustrates these effects in a comparative time chart 300. As provided in eqn. (3), an initial message 310 of k bits carried over initial period T can be replaced for greater capacity by an equivalent code message 320 of k' bits carried over abbreviated period T'. As pulse width decreases, the power also decreases. This requires amplification of the amplitude of the pulse to maintain a sufficient Signal-to-Noise power ratio.

The pulse width can be decreased until reaching the minimum pulse width allowable, which is dictated by the capacity relation in eqn. (1). For large bandwidths W→∞, the equation for channel capacity becomes:

$$\lim_{(w \to \infty)} k/\tau < 1.44 P_S/N_0, \qquad (4)$$

where τ represents capacity limit interval. Thus eqn. (4) indicates that the capacity C and source rate R depend only on signal power and the power spectral density.

Moreover, the capacity limit interval τ can be increased by altering the frequency range of the bandwidth W. If τ=T' and T' and k' are both increased so that the equality is maintained (from k/T original), the bandwidth being inversely proportional to r, shifts to a lower occupied signal bandwidth, for an equivalent amount of information. Thus, the bandwidth required can also be reduced with longer duration signals.

The actual pulse shapes need not be rectangular, which does not represent the most efficient waveform to transmit. Rather, other pulse shapes, such as sinc, raised cosine, etc., may be employed to produce more bandwidth efficient waveforms. Because a single integrated circuit chip cannot currently produce all of the necessary pulse widths, the circuitry to create the pulses may be grouped and subgrouped into circuits to create pulses of different temporal-widths, such as by a digital-to-analog converter (DAC).

The transmitted pulses may be received through frequency "bandpass" filtering. This technique may be based on the bandwidth of the transmitted signals frequency domain representation, e.g., a Fourier transform of the transmitted time-domain pulse. In particular, the normalized sinc function for digital signal processing and communication theory may be expressed as $$\mathrm{sinc}(x) \equiv \frac{\sin(\pi x)}{\pi x}$$

(the function being equal to unity at the x=0 singularity).

The sinc pulse represents a substantially more effective bandwidth efficient waveform than rectangular. FIG. 4 provides time and frequency domain plots 400 illustrating the sinc pulse waveform and its Fourier Transform (FT). The sinc pulse requires only half the bandwidth of a corresponding rectangular pulse. The sinc time plot 410 features time t as the abscissa 420 and voltage (in volts) as the ordinate 430. A sinc waveform 440 has a peak voltage A at zero time and can be expressed as A·sinc(2πt/τ). This expression provides positive voltage amplitude over pulse width r (bounded by ±τ/2). The frequency domain plot 450 features frequency as the abscissa 460 and voltage per wavelength as the ordinate 470, producing a rectangular waveform 480 having an amplitude of A÷2π between bounds±1÷(2τ) and zero elsewhere.

Figure 5:
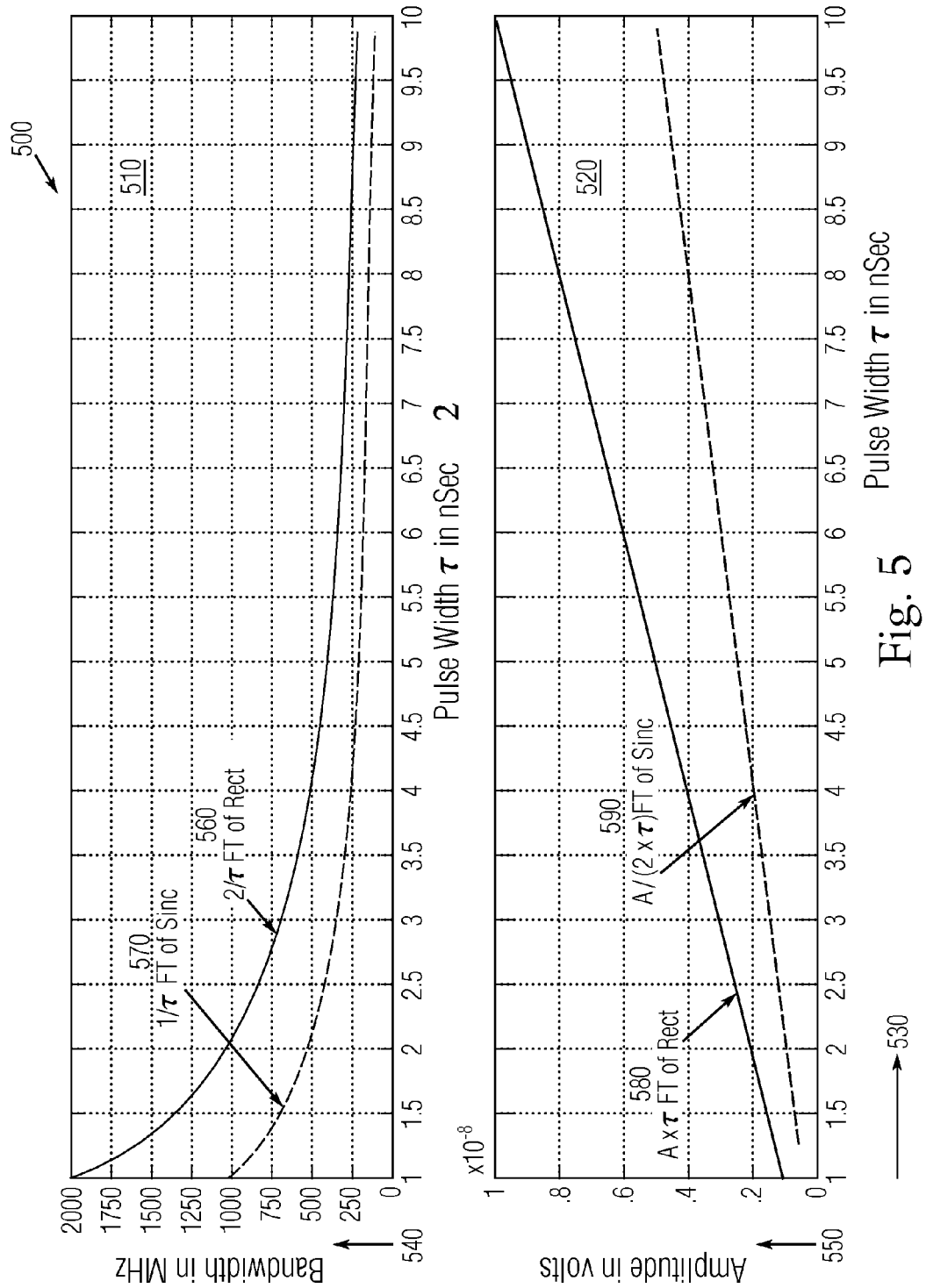
FIG. 5 is a graph of pulse width comparisons.

FIG. 5 shows pulse width plots 500 for bandwidth 510 and amplitude 520. Pulse width r (ns) represents the abscissa 530 for both plots, whereas bandwidth (MHz) represents the ordinate 540 for the upper plot 510 and amplitude (volts) represents the ordinate 550 for the lower plot 520. The upper plot 510 features asymptotically diminishing bandwidth curves: rectangular pulse FT of 2÷r by the solid line 560 and sinc pulse FT of 1÷τ by the dash line 570. The lower plot 520 features ascending amplitude curves: rectangular pulse A·τ by the solid line 580 and sinc pulse A·τ÷2 by the dash line 590.

Thus, as the pulse duration increases, the corresponding bandwidth required for the same pulse duration decreases. The bandwidth decreases from 250 MHz for pulse widths ranging from 2 ns to 4 ns to roughly 125 MHz for pulse widths ranging from 4 ns to 6 ns, a 50% decrease in bandwidth. Selective pulse shaping may be used to obtain desired bandwidth or other pulse-width characteristics. Thus, the desired bandwidth can be obtained within a specified bandwidth for the channel's Signal Power-to-Noise ratio being maintained within tolerances.

In terms of phase, amplitude and frequency variation, the concept is similar. A large number of bits are assigned to a signal characteristic. Usually, phase and amplitude are combined in a method known as Quadrature Amplitude Modulation (QAM). Variations with frequency include Frequency Modulation methods. Bandwidth efficiency increases with increasing bits assigned to a signal characteristic. Generally, assigning more bits to a signal characteristic provides the true gain in these types of systems.

Because the electronics on receivers (and transmitters) are clock based and "edge triggered", a different method of acquiring the pulse information is necessary. In this case, a very fast ADC may be necessary for practical sampling periods, e.g., on the order of pico-second (ps) or femto-second (fs). Although for longer period pulses, this restriction may be relaxed. In any case, the Nyquist relation $f_s = 2 f_{max}$ must be maintained, where $f_s = 1 \div t_s$ or sampling frequency, such that $t_s$ is sampling time interval, and $f_{max}$ is the highest frequency of the signal. Because so much information is contained in any one signal characteristic, extremely fast buffering and decoding methods are necessary. The time between signal characteristic changes have to be weighed carefully against the capabilities of the decoding mechanisms.

Codeword Reduction:

The codeword list may be refined by reuse and reassignment to obviate the limit on the number of signal variations possible. Reducing the number of pulses necessary to communicate can be accomplished by allowing pulse (or parameter) reuse. That is, software, or firmware, can transfer information in "segments", of for example, one-hundred codewords, which contain one-hundred "blocks" of information.

To transfer the next "block" of information, the pulse width (or signal parameter) associated with the meaning of a pattern or codebook entry can be changed. The transmitter can transmit the change to the receiver. Subsequently, the pulse widths (or other signal parameter) can be reassigned to different codewords. Data compression may benefit under conditions involving an excessively large number of codewords. The compressed data can also be transmitted to the parsing algorithm 220, enabling even higher data transfer rates.

Error Correction:

There are two basic ways to design the channel coder and protocol for an error correcting system: automatic repeat-request (ARQ) and forward error correction (FEC). In ARQ, the transmitter sends the data along with an error detection code that the receiver uses to check for errors and request retransmission of erroneous data. The receiver may send an acknowledge signal <ACK> (for no errors), and a not-acknowledge signal <NAK> when errors have occurred and request retransmission.

In FEC, the transmitter encodes the data with an error-correcting code that the receiver uses to decode the information sent into the most likely transited sequence. One typical method used to perform FEC is called Hamming Coding.

Producing a Hamming code requires creating a Hamming Generator Matrix and an inverse generator matrix on the received data. Cyclic Redundancy checks are also a commonly used method to detect errors.

The signals transmitted have varying parameters such as amplitude, duration, phase, and frequency, but the information may initially be in binary and converted to binary data at the receiver. Because the codewords are initially sent in binary, either FEC or ARQ may be used directly on the on the binary data. The variable signal characteristic data can be converted to an analog signal and digitized to convert them back to their original sense in binary. The binary data are what decisions are made upon based on correct or incorrect decoding. If FEC the best match is selected. If ARQ is used, the receiver sends an <ACK> or <NAK> based on the data received.

Generally, the type of error correction depends on whether the data are "lossless" or "lossy" in character. Lossless means that there must be an exact match between the transmitted and received data. Lossy means that some data can be lost without serious consequences. For example, video (or voice) information can tolerate nontrivial loss in resolution without producing serious communications or resolution problems.

For necessary lossless transmission without determining an exact match to the transmitted signal in the receiver's codebook, a retransmit request can be issued from <NAK>. If some error can be tolerated, the closest match can be accepted. In both cases the initial codewords (matching binary patterns) should be converted to Grey code. Grey codes reduce the largest possible size of the binary error, and may be reversed at the receiver using the inverse algorithm used to create them at the transmitter. Probability assignments generated at the receiver based on an algorithm, which determine the most probable pattern, made in decoding, may also aid in that effort.

Modem Design:

Because modems utilize modulation onto a wired (or wireless) channel, the previously discussed heuristic applies. QAM provides an exemplary type of modulation highly amenable to the techniques employed herein. QAM provides a form of modulation that represents digital data as variations in the amplitude and phase of a carrier wave. QAM can carry large numbers of bits/symbol to identify a "position" in signal space. QAM is used in numerous types of systems, such as ADSL (Asymmetric Digital Subscriber Lines) and Cable Modems.

Figure 6:
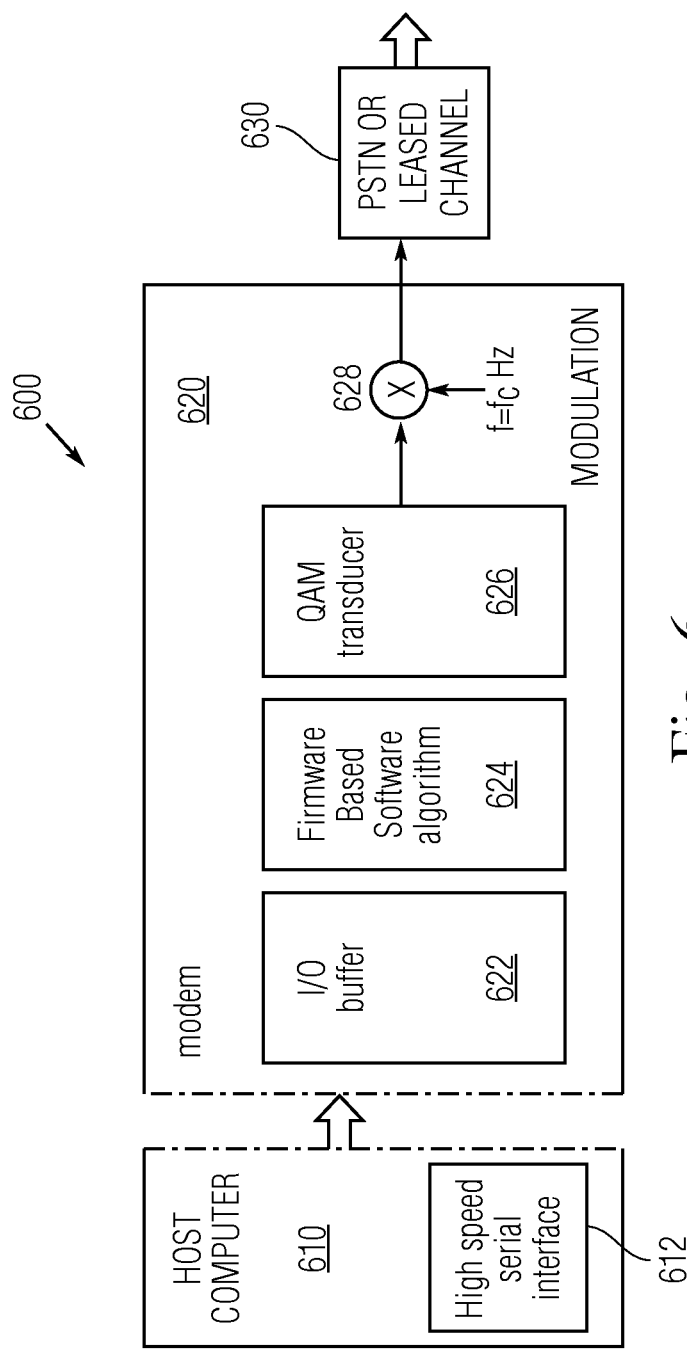
FIG. 6 is a block diagram of a bandpass modem.

FIG. 6 provides a block diagram 600 for modem communication. A host computer 610 includes high speed serial (or parallel) interface 612 for communication via a modem 620. The computer 610 forwards data to an I/O buffer 622 on the modem 620. A firmware-based software algorithm 624 searches for repeating binary patterns in an I/O buffer 622 as discussed previously. The software on the modem 620 may be embedded in Read-Only-Memory (ROM) similar to 220.

Upon completion, the "codewords" found can then be transmitted in standard binary form by a transducer 626 that represents the binary patterns for future transmissions. The transducer can employ QAM or alternate Phase-based modulation. Upon conversion of the binary pattern to an analog symbol by the QAM transducer 626, the carrier frequency $f_c$ can be selected for modulation 628 to "translate" the symbol into the desired frequency band. For example, the Public Switched Telephone Network (PSTN) occupies a carrier bandwidth from 1 kHz to 2 kHz. The information is then transmitted to the channel 630.

Codeword Bandwidth:

The minimum bandwidth relates to channel capacity C can be evaluated. The channel capacity of a white band-limited Gaussian channel is:

$$C = B \log_2(1+S/N) = R, \quad (5)$$

where C is the channel capacity (in bits-per-second), B is the channel bandwidth (in Hertz), S/N is the ratio of the mean-square signal to the mean-square noise power.

Recall that for M number of codewords can be expressed in terms of bit rate as $\log_2 M = RT = k$, such that $M = 2^k = 2^{RT}$, which can be set to be constant. Moreover, modified $M' = 2^{R\tau}$, such that the corresponding source rate can be expressed as:

$$R' = R(T/\tau) \leq B(T/\tau)\log_2(1+S/N), \quad (6)$$

where reduced pulse width enables increase in source rate, thereby effectively increasing channel capacity.

For example, transmission of an entire codeword set one-hundred times of 65,536 codewords that are 64 bits wide (per codeword), the total number of bits to transmit is: $R \leq C = 100 \times 64 \times 65,536 = 419,430,400$ bits/second. For signal-to-noise ratio S/N being one-hundred dB, such that from eqn. (5), $B = 419,430,400 \div \log_2(101) = 63$ MHz for un-encoded data bandwidth.

With coding, each 64-bit packet can be reduced to a single variation of signal-characteristics over the same period. Thus, channel capacity computation yields $R \leq C = 65,536 \times 100$ or $6.5536 \times 10^6$, the 64 bits being replaced by a variable width symbol. Then $6 = 6.5536 \times 10^6 \div \log_2(101) = 0.9$ MHz, thereby reducing necessary bandwidth by two orders of magnitude. For 8 bits per codeword, this rate becomes $419,430,400 \div 8 = 5.24288 \times 10^7$ (dividing the channel capacity by eight rather than sixty-four).

Shannon's Theorem applies even for the 8-bit length with only $2^8$ distinct (non-repeating) codewords are available. As such, bandwidth reduces (from unencoded 63 MHz to $B = 52428800 \div 6.67 = 7.86$ MHz. Raising the number of bits to encode into a single variation, increases the bandwidth gains—e.g., replacing from 8-bit with 64-bit reduces bandwidth by ~7 MHz.

Figure 7A:
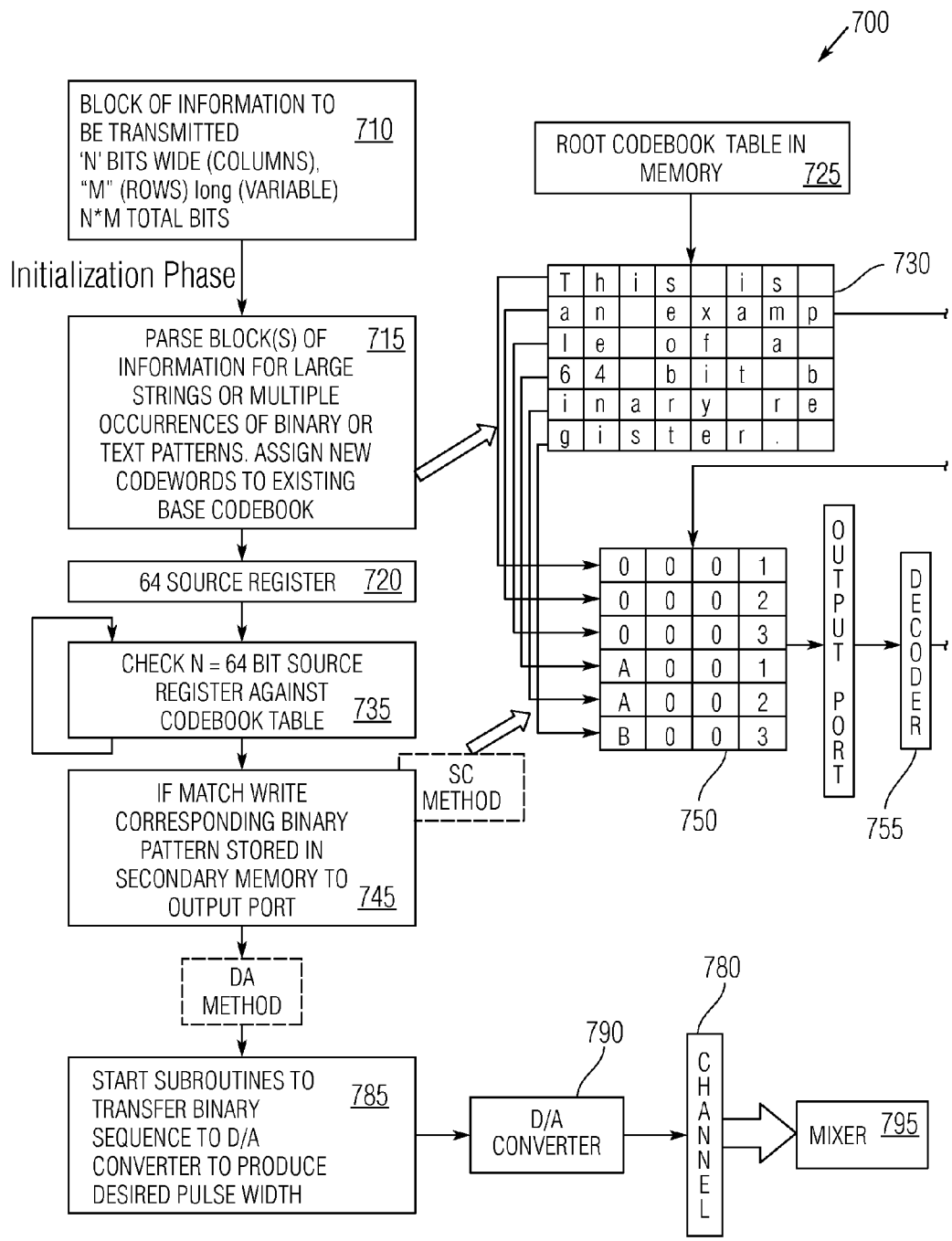
FIGS. 7A and 7B are portions of a block diagram of encoding and transmitting codewords.
Figure 7B:
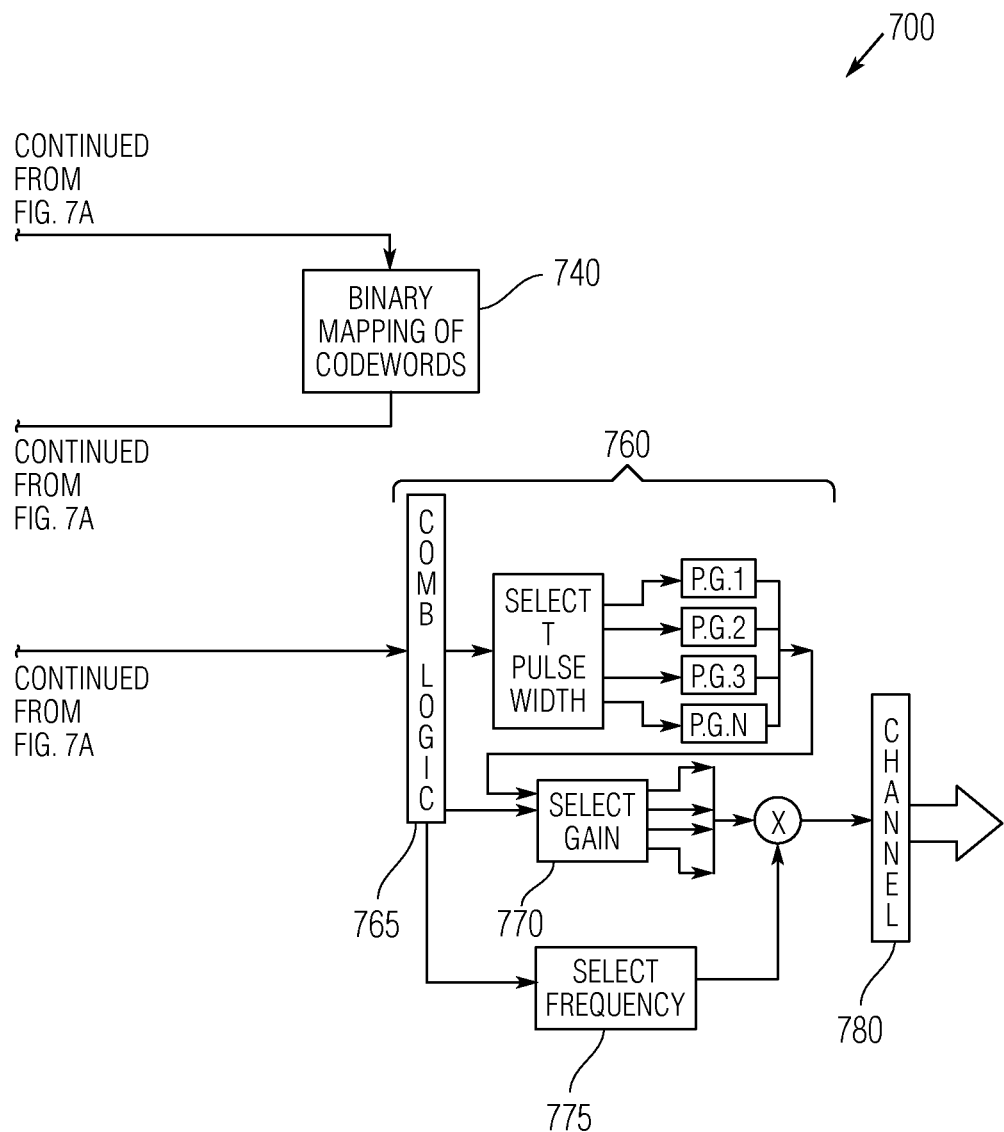

FIGS. 7A and 7B illustrate a block diagram 700 to encode and decode an information block 710 to a channel with variable bandwidth, gain or frequency. Initially, a software algorithm at 715 parses the N×M information block into strings or multiple occurrences of patterns. For a 64-bit source registry 720, the block is N=64 bits wide. The algorithm assigns these as new codewords into an existing base (or root) codebook stored in codeword memory 725, and provides these to, for example, the register 720. The process compares at 735 the register 720 to each 64-bit fixed codeword entry 730 stored in memory 725 (e.g., as a stack) for binary mapping 740.

For a found match at 745, the process stores a binary pattern corresponding to the match into a secondary codebook 750, which can be altered according to the base codebook in memory 725 as new entries are added. (The secondary codebook 750 has variable size and can be stored in software, rather than being hardcoded.) The pattern in the secondary codebook 750 can be written to a decoder 755 that selects a specific pulse width with a pulse generator 760 (e.g., semiconductor or laser diode).

Combinatorial logic 765 can be employed to select a gain parameter 770 or alternatively a frequency parameter 775 for transmission via a channel 780 to a receiver. These parameters can be adjusted by appropriate coefficients. This is known as the semiconductor method (SC) of signal generation. Alternatively, the process can at 785 instantiate subroutines to transfer the binary sequence to a DAC 790 to produce the selected pulse width for transmission via the channel 780 to submit to a mixer 795 that supplies the receiver.

In summary, the method of information transmission process described herein for sending a message packet from a host platform to a recipient includes the operations for encoding the message packet as corresponding to a specific pulse width; transmitting a signal having the specific pulse width across a channel; analyzing the signal as corresponding to the specific pulse width; and decoding the specific pulse width to obtain the message packet.

In various exemplary, embodiments, the encoding operation further includes assigning a code value from a codelist to the message packet; correlating the code value to a pulse generator within a pulse generator bank; and generating the signal having the specific pulse width by the pulse generator. Moreover, the code value can be binary and/or include assigning a coefficient to a generated pulse width produced by the pulse generator; and multiplying the coefficient to the generated pulse width to obtain the specific pulse width.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A communication device for information transmission, the information incorporated into at least one message packet composed of first and second codewords, the device comprising:
    an encoder for encoding the message packet as corresponding to first and second specific pulse widths in accordance with a codebook that relates the first codeword to said first specific pulse width and the second codeword to said second specific pulse width, said first and second pulse widths being distinguishable from each other;
    wherein said encoder further comprises:
        an designator for assigning a first code value and a second code value from a codelist to the message packet;
        a correlator for correlating said first code value to a first specific pulse and said second code value to a second specific pulse; and
        a pulse generator for producing said signal having said first and second specific pulse widths, wherein said specific pulses correspond to said specific pulse widths;
    a transmitter for transmitting a signal having said first specific pulse width and said second specific pulse width across a channel;
    a processor for analyzing said signal as corresponding to said first specific pulse width and said second specific pulse width; and
    a decoder for decoding said first specific pulse width and said second specific pulse width to obtain the message packet;
    said correlator further comprises:
        a coefficient designator for assigning a first coefficient to a first generated pulse width and a second coefficient to a second generated pulse width, said generated pulse widths corresponding to said specific pulses produced by said pulse generator; and
        a product processor for multiplying said first and second coefficients respectively to said first and second generated pulse widths to correspondingly obtain said first and second specific pulse widths.

2. The device according to claim 1, wherein said first and second code values are binary.

3. The device according to claim 1, wherein said pulse generator forms said signal as a sinc waveform.

4. The device according to claim 1, wherein said first and second pulse widths correspond to first and second binary patterns.

5. A communication device for information transmission, the information incorporated into at least one message packet composed of first and second codewords, the device comprising:
    an encoder for encoding the message packet as corresponding to first and second specific binary patterns and encoding said first and second specific binary patterns as corresponding to first and second specific pulse widths in accordance with a codebook that relates the first codeword to said first specific binary pattern and the second codeword to said second specific binary pattern, said first and second specific binary patterns being distinguishable from each other;
    wherein said encoder further comprises:
        an designator for assigning a first code value and a second code value from a codelist to the message packet;
        a correlator for correlating said first code value to a first specific pulse and said second code value to a second specific pulse; and
        a pulse generator for producing said signal having said first and second specific pulse widths, wherein said specific pulses correspond to said specific pulse widths;
    wherein said first and second pulse widths being distinguishable from each other;
    a transmitter for transmitting a signal having said first and second specific pulse width across a channel;
    a processor for analyzing said signal as corresponding to said first and second specific pulse width; and
    a decoder for decoding said first and second specific pulse width to obtain the message packet;
    said correlator further comprises:
        a coefficient designator for assigning a first coefficient to a first generated pulse width and a second coefficient to a second generated pulse width, said generated pulse widths corresponding to said specific pulses produced by said pulse generator; and
        a product processor for multiplying said first and second coefficients respectively to said first and second generated pulse widths to correspondingly obtain said first and second specific pulse widths.

* * * * *